United States Patent
Sakurai

(10) Patent No.: US 9,069,514 B2
(45) Date of Patent: Jun. 30, 2015

(54) IMAGE PROCESSING APPARATUS, INCLUDING CONVERSION PROCESS JUDGING, CONNECTABLE TO SERVER VIA NETWORK

(71) Applicant: Kunihiko Sakurai, Gifu (JP)

(72) Inventor: Kunihiko Sakurai, Gifu (JP)

(73) Assignee: BROTHER KOGYO KABUSHIKI KAISHA, Nagoya, Aichi (JP)

( * ) Notice: Subject to any disclaimer, the term of this patent is extended or adjusted under 35 U.S.C. 154(b) by 0 days.

(21) Appl. No.: 14/013,733

(22) Filed: Aug. 29, 2013

(65) Prior Publication Data

US 2014/0063547 A1 Mar. 6, 2014

(30) Foreign Application Priority Data

Aug. 31, 2012 (JP) .................................. 2012-191040

(51) Int. Cl.
  *G06F 3/12* (2006.01)
  *H04N 1/00* (2006.01)
(52) U.S. Cl.
  CPC ............ *G06F 3/1294* (2013.01); *G06F 3/1211* (2013.01); *G06F 3/1247* (2013.01); *G06F 3/1263* (2013.01); *G06F 3/1292* (2013.01); *H04N 1/00244* (2013.01); *H04N 1/00474* (2013.01); *H04N 1/00477* (2013.01); *H04N 1/0048* (2013.01); *H04N 1/00482* (2013.01); *H04N 2201/001* (2013.01); *H04N 2201/0094* (2013.01); *H04N 2201/0065* (2013.01); *H04N 1/00233* (2013.01)
(58) Field of Classification Search
  CPC ... G06F 3/1217; G06F 3/1247; G06F 3/1294; H04N 1/00244; H04N 2201/001; H04N 2201/0094

USPC ................................................ 358/1.15, 1.13
See application file for complete search history.

(56) References Cited

U.S. PATENT DOCUMENTS

| 5,724,555 | A | 3/1998 | Wadsworth |
| 5,923,826 | A * | 7/1999 | Grzenda et al. ............... 358/1.15 |
| 6,982,811 | B2 * | 1/2006 | Sato ............................... 358/1.4 |

(Continued)

FOREIGN PATENT DOCUMENTS

| JP | 9-018639 A | 1/1997 |
| JP | 2004-058491 A | 2/2004 |

(Continued)

*Primary Examiner* — Ashish K Thomas
*Assistant Examiner* — Walter Yehl
(74) *Attorney, Agent, or Firm* — Scully, Scott, Murphy & Presser, P.C.

(57) ABSTRACT

An image processing apparatus implements: receiving a first command for execution of an image processing function; supplying a server with a conversion command if the conversion process should not be executed on the image processing apparatus; acquiring time data indicative of a conversion period of time that the server requires to execute the conversion process; receiving, within the conversion period of time, a second command for execution of an image processing function; starting execution of the second process within the conversion period of time if it is determined that the second process can be completed within the conversion period of time, and failing to start execution of the second process within the conversion period of time if it is determined that the second process cannot be completed within the conversion period of time; acquiring converted data from the server; and executing a prescribed process using the converted data.

10 Claims, 9 Drawing Sheets

(56) References Cited

U.S. PATENT DOCUMENTS

| | | | |
|---|---|---|---|
| 7,173,721 B1* | 2/2007 | Kobayashi et al. | 358/1.15 |
| 7,268,907 B2* | 9/2007 | Sato | 358/1.15 |
| 2001/0043355 A1* | 11/2001 | Bando | 358/1.15 |
| 2003/0011819 A1* | 1/2003 | Toda | 358/1.15 |
| 2009/0031231 A1* | 1/2009 | Tsujii | 715/764 |
| 2009/0128849 A1* | 5/2009 | Sakura | 358/1.15 |
| 2009/0168100 A1* | 7/2009 | Huster | 358/1.15 |
| 2010/0157363 A1 | 6/2010 | Ishikawa et al. | |
| 2011/0007352 A1* | 1/2011 | Kobashi | 358/1.15 |
| 2011/0242594 A1 | 10/2011 | Yabe | |
| 2011/0299112 A1* | 12/2011 | Ota | 358/1.15 |
| 2012/0086980 A1* | 4/2012 | Numata | 358/1.15 |
| 2012/0243024 A1* | 9/2012 | Miyata | 358/1.13 |
| 2013/0046970 A1* | 2/2013 | Abe | 713/152 |

FOREIGN PATENT DOCUMENTS

| | | | | |
|---|---|---|---|---|
| JP | 2004058491 A | * | 2/2004 | B41J 5/30 |
| JP | 2005-223514 A | | 8/2005 | |
| JP | 2010146486 A | | 7/2010 | |
| JP | 2011-138395 A | | 7/2011 | |

* cited by examiner

IMAGE PROCESSING APPARATUS, INCLUDING CONVERSION PROCESS JUDGING, CONNECTABLE TO SERVER VIA NETWORK

CROSS REFERENCE TO RELATED APPLICATION

This application claims priority from Japanese Patent Application No. 2012-191040 filed Aug. 31, 2012. The entire content of this priority application is incorporated herein by reference.

TECHNICAL FIELD

The present invention relates to an image processing apparatus connectable to a server via a network.

BACKGROUND

There has been conventionally proposed such a technology by which when an image processing apparatus receives a print instruction from outside, an apparatus other than the image processing apparatus, such as a server, executes a print process based on the print instruction. For example, there has been disclosed such a system, in which a printing device receives a print instruction from a user via a web browser. The printing device communicates with a print instruction receiving application server by designating text data, for which the print instruction was issued. The print instruction receiving application server converts the designated text data into print data. The printing device can receive another print instruction, while the print instruction receiving application server is generating the print data.

SUMMARY

According to the above-described technology, however, the process to be executed based on a preceding print instruction will possibly be delayed due to another instruction that is received while the server is generating print data for the preceding instruction.

In view of the foregoing, it is an object of the invention to provide a technology that can rapidly execute the process based on the preceding instruction.

In order to attain the above and other objects, the invention provides an image processing apparatus connectable to a server via a network, the image processing apparatus including: a processor; and a memory that stores computer readable instructions that cause, when executed by the processor, the image processing apparatus to implement: receiving a first command for execution of an image processing function; judging whether a conversion process should be executed on the image processing apparatus if a first process, which is to be executed based on the first command, includes the conversion process for converting image data; supplying the server with a conversion command for executing the conversion process on the image data if the conversion process should not be executed on the image processing apparatus; acquiring time data indicative of a conversion period of time that the server requires to execute the conversion process; receiving, within the conversion period of time, a second command for execution of an image processing function; judging whether a second process, which is to be executed based on the second command, can be completed within the conversion period of time; starting execution of the second process within the conversion period of time if it is determined that the second process can be completed within the conversion period of time, and failing to start execution of the second process within the conversion period of time if it is determined that the second process cannot be completed within the conversion period of time; acquiring from the server converted data that is obtained by executing the conversion process on the image data; and executing a prescribed process using the converted data.

According to another aspect, the present invention provides an image processing method including: receiving a first command for execution of an image processing function; judging whether a conversion process should be executed on the image processing apparatus if a first process, which is to be executed based on the first command, includes the conversion process for converting image data; supplying a server with a conversion command for executing the conversion process on the image data if the conversion process should not be executed on the image processing apparatus; acquiring time data indicative of a conversion period of time that the server requires to execute the conversion process; receiving, within the conversion period of time, a second command for execution of an image processing function; judging whether a second process, which is to be executed based on the second command, can be completed within the conversion period of time; starting execution of the second process within the conversion period of time if it is determined that the second process can be completed within the conversion period of time, and failing to start execution of the second process within the conversion period of time if it is determined that the second process cannot be completed within the conversion period of time; acquiring from the server converted data that is obtained by executing the conversion process on the image data; and executing a prescribed process using the converted data.

According to still another aspect, the present invention provides a non-transitory computer-readable medium storing a set of program instructions installed on and executed by a computer for controlling an image processing apparatus connectable to a server via a network, the program instructions, when executed by the computer, causing the image processing apparatus to perform: receiving a first command for execution of an image processing function; judging whether a conversion process should be executed on the image processing apparatus if a first process, which is to be executed based on the first command, includes the conversion process for converting image data; supplying the server with a conversion command for executing the conversion process on the image data if the conversion process should not be executed on the image processing apparatus; acquiring time data indicative of a conversion period of time that the server requires to execute the conversion process; receiving, within the conversion period of time, a second command for execution of an image processing function; judging whether a second process, which is to be executed based on the second command, can be completed within the conversion period of time; starting execution of the second process within the conversion period of time if it is determined that the second process can be completed within the conversion period of time, and failing to start execution of the second process within the conversion period of time if it is determined that the second process cannot be completed within the conversion period of time; acquiring from the server converted data that is obtained by executing the conversion process on the image data; and executing a prescribed process using the converted data.

BRIEF DESCRIPTION OF THE DRAWINGS

The particular features and advantages of the invention as well as other objects will become apparent from the following description taken in connection with the accompanying drawings, in which.

DETAILED DESCRIPTION

Figure 1:
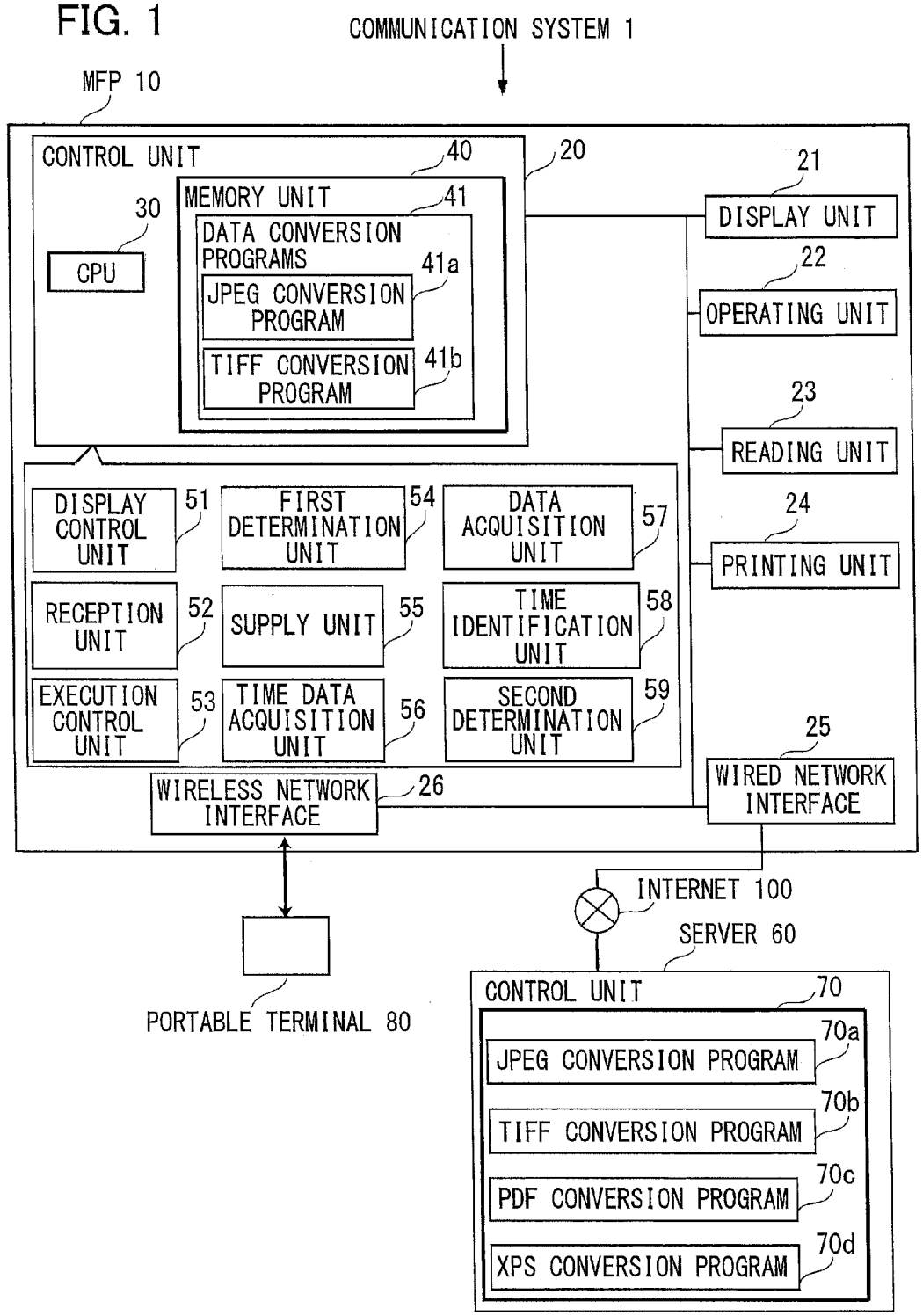
FIG. 1 is a block diagram showing the structure of a communication system according to an embodiment of the present invention.

An image processing apparatus according to an embodiment of the invention will be described while referring to the accompanying drawings wherein like parts and components are designated by the same reference numerals to avoid duplicating description.

Structure of a Communication System

FIG. 1 shows a communication system 1 according to an embodiment. The communication system 1 includes a multifunction peripheral (MFP) 10, a portable terminal 80, and a server 60. The MFP 10 and server 60 are connected and capable of communicating with each other via an internet 100. The MFP 10 and portable terminal 80 communicate bi-directionally via wireless communications.

Structure of the MFP

The MFP 10 includes a control unit 20, a display unit 21, an operating unit 22, a reading unit 23, a printing unit 24, a wired network interface 25, and a wireless network interface 26.

The control unit 20 includes a CPU 30, and a memory unit 40. The CPU 30 implements various processes based on programs stored in the memory unit 40. By implementing these processes, the CPU 30 functions as a display control unit 51, a reception unit 52, an execution control unit 53, a first determination unit 54, a supply unit 55, a time data acquisition unit 56, a data acquisition unit 57, a time identification unit 58, and a second determination unit 59. The memory unit 40 is configured of ROM, RAM, a hard disk, or the like. The memory unit 40 stores the programs that are executed by the CPU 30. FIG. 1 shows only some of these programs; specifically, data conversion programs 41. The data conversion programs 41 will be described later.

The display unit 21 includes a display panel for displaying various screens. In the embodiment, the display unit 21 is a touchscreen and thereby functions also as the operating unit 22. Thus, the user can select a desired item displayed on the screen of the display unit 21 by pressing objects displayed in the display unit 21. The operating unit 22 includes a plurality of keys. By operating the operating unit 22, the user can input various commands and other information into the MFP 10.

The reading unit 23 is configured of a scanning mechanism including an optical sensor, such as a charge-coupled device (CCD), and implementing a scanner function. The reading unit 23 scans an original to generate scan data. The reading unit 23 also includes an automatic document feeder (ADF) that is driven by a motor to automatically convey sheets of an original prepared by the user. The optical sensor remains stationary at a prescribed position and optically reads sheets of the original conveyed by the ADF. The optical sensor in the embodiment is disposed in a prescribed position for reading both surfaces of the original in one pass.

The printing unit 24 has an inkjet or laser system for implementing a printer function. The printing unit 24 acquires print data from the control unit 20 and executes a printing operation to print images on a recording medium based on the acquired print data.

The wired network interface 25 functions to connect the MFP 10 to the Internet 100 through a wired network (a LAN, for example). The wireless network interface 26 functions to communicate wirelessly with the portable terminal 80 according to the Wi-Fi (Wireless Fidelity) communication method, for example. The type of wireless communications used between the MFP 10 and portable terminal 80 is not limited to Wi-Fi, but may be Bluetooth (registered trademark), infrared communications, or Near Field Communication (NFC).

Data Conversion Programs

The data conversion programs 41 stored in the memory unit 40 serve to implement data conversion processes for converting image data to print data. The data conversion processes are performed on types of image data called a page description language (PDL) and generate print data from the PDL data. In the embodiment, the data conversion programs 41 include a JPEG conversion program 41a, and a TIFF conversion program 41b. The JPEG conversion program 41a converts PDL data described in the JPEG (Joint Photographic Experts Group) data format, while the TIFF conversion program 41b converts PDL data described in the TIFF (Tagged Image File Format) data format.

In the data conversion process, the CPU 30 first executes a process to produce multivalue (256-level, for example) RGB bitmap data from the PDL data (hereinafter called a RIP (raster image processor) process). Next, the CPU 30 executes a process to produce multilevel CMYK bitmap data from the multilevel RGB bitmap data (hereinafter called a color conversion process). Finally, the CPU 30 executes a process to produce CMYK bitmap data having relatively few levels from the CMYK bitmap data (hereinafter called a halftone process). For example, the resulting CMYK bitmap data may have two levels (dot or no dot) or three levels (large dot, small dot, or no dot). The resulting CMYK bitmap data is the print data.

The JPEG conversion program 41a and TIFF conversion program 41b implement data conversion processes for producing print data from PDL data in the JPEG and TIFF data formats, respectively. Since the memory unit 40 includes both the JPEG conversion program 41a and TIFF conversion program 41b, the control unit 20 can implement both a data conversion process on PDL data in the JPEG format and a data conversion process on PDL data in the TIFF format.

However, the memory unit 40 does not store conversion programs capable of converting PDL data described in other data formats, such as the Portable Document Format (PDF). Hence, the control unit 20 cannot generate print data (cannot execute a data conversion process) based on PDL data described in other data formats.

However, the memory unit 40 may be configured to store data conversion programs for implementing data conversion processes on PDL data described in other data formats. For example, the memory unit 40 may store a PDF conversion program for executing a RIP process on PDL data described in the PDF data format, an XPS conversion program for executing a data conversion process on PDL data described in the XML paper specification (XPS) data format, and the like.

Structure of the Server

The manufacturer of the MFP 10 also provides the server 60. The server 60 includes a control unit 70 having a CPU and memory (not shown). The memory of the control unit 70 stores a JPEG conversion program 70a, a TIFF conversion program 70b, a PDF conversion program 70c, and an XPS conversion program 70d. Hence, the control unit 70 of the server 60 can execute a data conversion process to produce print data from PDL data described in any of the formats, JPEG, TIFF, PDF, and XPS. Thus, if the PDL data is described in the PDF format, for example, the control unit 20 of the MFP 10 cannot execute a data conversion process on the PDL data, but the control unit 70 of the server 60 can.

Structure of the Portable Terminal

The portable terminal 80 includes a CPU, memory, a hard disk drive, and the like (not shown). The CPU of the portable terminal 80 transmits PDL data stored in the memory of the portable terminal 80 to the MFP 10 in response to a user command.

Printing Process on the MFP

Figure 2:
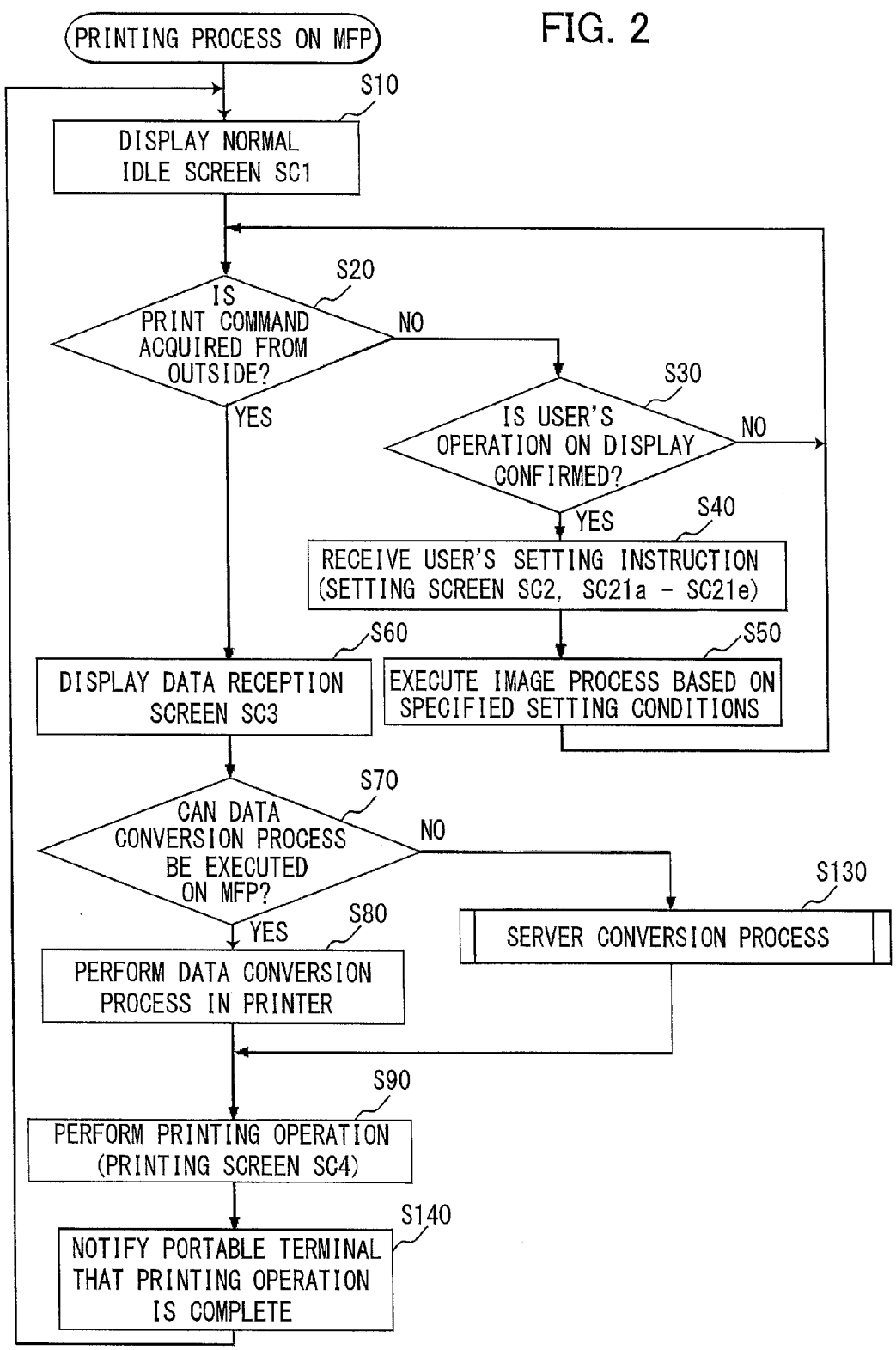
FIG. 2 is a flowchart illustrating steps in a printing process executed by a multifunction peripheral shown in FIG. 1.

FIG. 2 is a flowchart illustrating steps in a printing process executed by the MFP 10. The CPU 30 begins the printing process when the user turns on the power to the MFP 10. In S10 at the beginning of the printing process, the display control unit 51 displays a normal idle screen SC1 on the display unit 21.

Figure 3A:
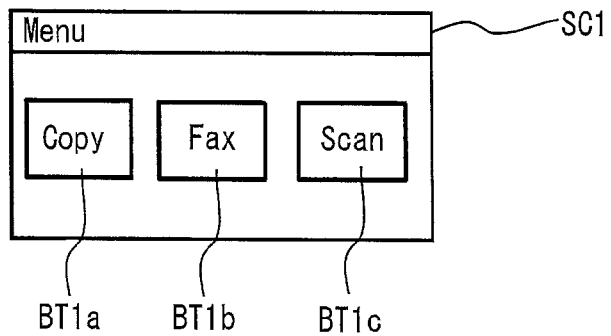
FIGS. 3A-3D show various screens displayed on a display unit shown in FIG. 1 during the process of FIG. 2.

FIGS. 3A-3D show various screens displayed on the display unit 21. FIG. 3A shows the normal idle screen SC1 displayed on the display unit 21 in S10. The normal idle screen SC1 enables the user to select a desired image-processing function. As shown in FIG. 3A, the normal idle screen SC1 has a copy function selection button BT1a, a fax function selection button BT1b, and a scan function selection button BT1c.

The image-processing functions possessed by the MFP 10 according to the embodiment include a print function, a copy function, a fax function, and a scan function. Of these functions, execution of the print function is controlled by commands issued from the portable terminal 80. Therefore, a button for selecting the print function is not displayed in the normal idle screen SC1.

In S20 the reception unit 52 determines whether a print command was acquired from the portable terminal 80. This occurs when the user of the portable terminal 80 inputs into the portable terminal 80 data specifying a desired PDL file to be printed and a command for supplying this PDL data to the MFP 10, for example. The portable terminal 80 supplies the PDL data to the MFP 10 wirelessly in this case. The process advances to S60 when the MFP 10 has acquired PDL data from the portable terminal 80 (S20: YES).

However, if the reception unit 52 determines that a print command was not acquired (S20: NO), in S30 the reception unit 52 determines whether the user has operated one of the buttons BT1a-BT1c in the normal idle screen SC1. If the buttons BT1a-BT1c have not been operated (S30: NO), the reception unit 52 returns to S20 and continues to monitor whether a print command has been received from the portable terminal 80. The normal idle screen SC1 remains displayed on the display unit 21 until a print command is received from the portable terminal 80 (S20: YES).

If the reception unit 52 determines that the user has operated one of the buttons BT1a-BT1c in the normal idle screen SC1 (S30: YES), the process advances to S40. Here, the process will be described for the case in which the user has selected the scan function selection button BT1c in the normal idle screen SC1 (i.e., when the user wishes to execute a scanning operation).

In S40 the display control unit 51 displays a settings screen SC2 on the display unit 21 enabling the user to specify conditions for executing a scanning operation.

Figure 3B:
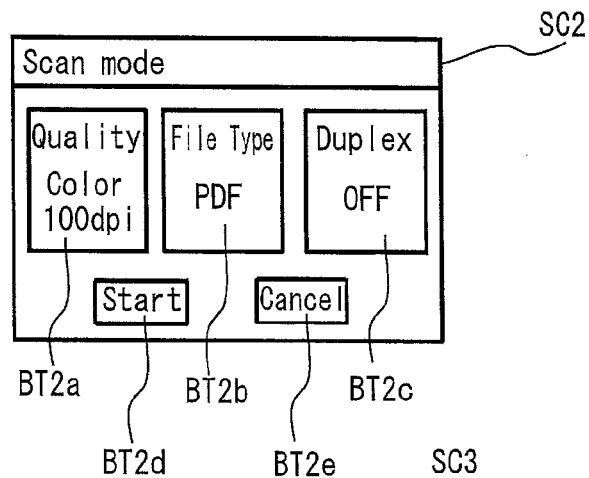
Figure 3C:
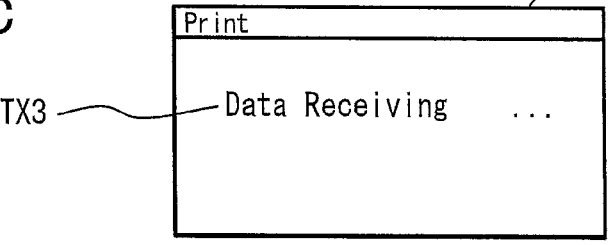
Figure 3D:
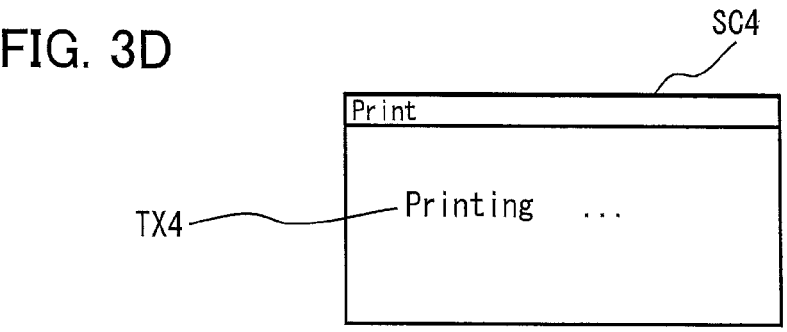

FIG. 3B shows the settings screen SC2. The settings screen SC2 includes modification buttons BT2a-BT2c for modifying the conditions for executing a scanning operation; a start button BT2d; and a cancel button BT2e. The modification button BT2a is selected to adjust the quality of scan data produced in the scanning operation (resolution and other scanning conditions). The modification button BT2b is selected to change the format of the scan data produced. The modification button BT2c is selected to change the duplex setting indicating whether the reading unit 23 is to read both sides of original sheets.

In the settings screen SC2 of FIG. 3B, the scan data quality is set to "Color 100 dpi"; the format of scan data to be generated is set to "PDF"; and the duplex setting is set to "OFF" (i.e., do not execute a duplex scan). When the user wishes to execute a scanning operation based on the conditions displayed in the settings screen SC2, the user selects the start button BT2d. On the other hand, if the user decides not to execute a scanning operation, the user can select the cancel button BT2e. When the cancel button BT2e is selected, the display control unit 51 displays the normal idle screen SC1 (FIG. 3A) on the display unit 21 in place of the settings screen SC2. However, if the user selects the start button BT2d, the execution control unit 53 executes the process in S50.

When the user selects the modification button BT2a in the settings screen SC2, the display control unit 51 displays scanning quality modification screens SC21a-SC21c (described later with reference to FIG. 4A) for modifying the scanning quality. When the user selects the modification button BT2b, the display control unit 51 displays a data format modification screen SC21d (described later with reference to FIG. 4B) for modifying the format of the scan data. When the user selects the modification button BT2c, the display control unit 51 displays a duplex setting modification screen SC21e (described later with reference to FIG. 4C) for modifying the duplex setting.

Figure 4A:
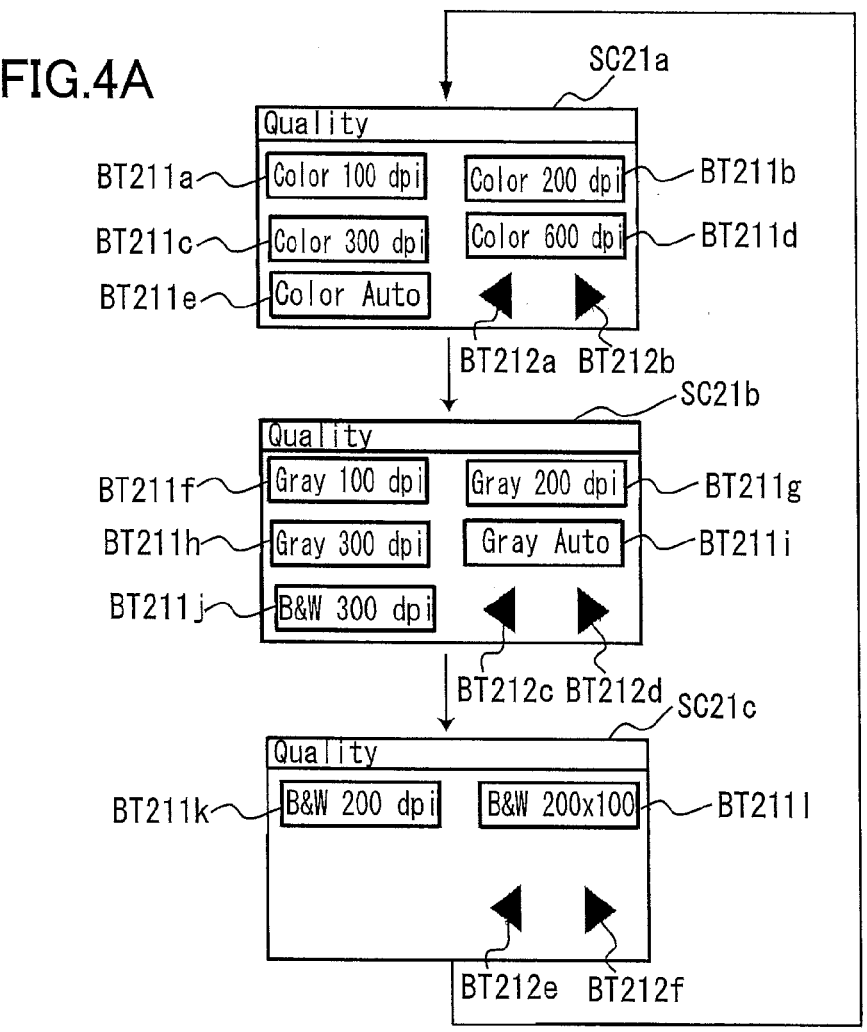
FIGS. 4A-4C show other various screens displayed on the display unit during the process of FIG. 2.
Figure 4B:
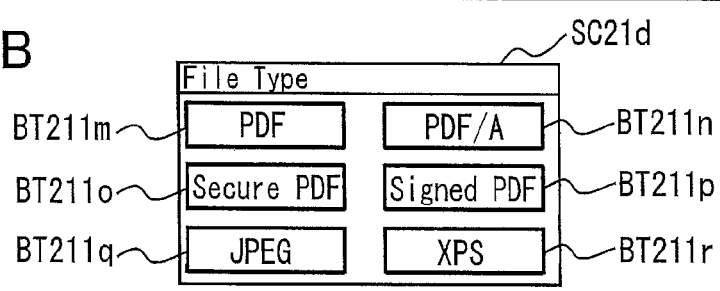
Figure 4C:
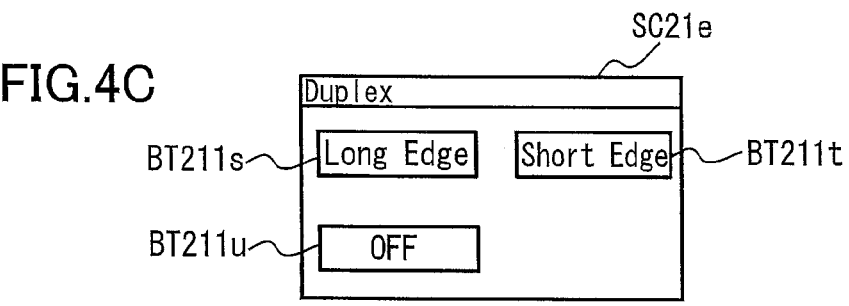

FIGS. 4A-4C show the setting modification screens SC21a-SC21e. FIG. 4A shows the scanning quality modification screens SC21a-SC21c. The scanning quality modification screen SC21a includes scanning quality modification buttons BT211a-BT211e, and toggle buttons BT212a and BT212b. Similarly, the scanning quality modification screen SC21b includes scanning quality modification buttons BT211f-BT211j, and toggle buttons BT212c and BT212d. Likewise, the scanning quality modification screen SC21c includes scanning quality modification buttons BT211k and BT211l, and toggle buttons BT211e and BT212f.

The toggle buttons BT212a-BT212f serve to toggle the display among the scanning quality modification screens SC21a-SC21c. After the user selects one of the scanning quality modification buttons BT211a-BT211l, the display control unit 51 displays the settings screen SC2 on the display unit 21 in place of the scanning quality modification screens SC21a-SC21c.

The user selects a desired scanning quality from among the scanning quality modification buttons BT211a-BT211l included in the scanning quality modification screens SC21a-SC21c.

Note that color scan data is generated when one of the scanning quality modification buttons BT211a-BT211e indicating "Color" has been selected. Color scan data is produced by RGB values satisfying Equation (1) shown below. In other words, color scan data is set so that each of the R, G, and B values takes on an independent integer value.

$$(R,G,B)=(a,b,c) \quad \text{Equation (1)}$$

Here, a, b, and c are integers that satisfy the expression 0≤a, b, c<256, for example.

Gray scan data is generated when one of the scanning quality modification buttons BT211f-BT211i indicating "Gray" has been selected. Gray scan data is produced by RGB values satisfying Equation (2) shown below. In other words, gray scan data is set so that each of the R, G, and B values takes on the same integer value selected from integer values for three or more levels (256 levels, for example).

$$(R,G,B)=(d,d,d) \quad \text{Equation (2)}$$

Here, d is an integer that satisfies the expression 0≤d<256, for example.

Monochromatic scan data is generated when one of the scanning quality modification buttons BT211j-BT211l indicating "B&W" has been selected. Monochromatic scan data is produced by RGB values satisfying Equation (3) shown below. That is, monochromatic scan data is set so that each of the R, G, and B values takes on the same integer value selected from among integer values for two levels.

$$(R,G,B)=(e,e,e) \quad \text{Equation (3)}$$

Here, e is an integer that is either 0 or 255, for example.

The number displayed in each button indicates the resolution of the scan data. "Auto" displayed in scanning quality modification buttons BT211e and BT211i indicates that a default resolution (300 dpi, for example) pre-stored in the memory unit 40 will be selected. As a variation, the control unit 20 may set the resolution based on the content of the original after the reading unit 23 has read the original.

FIG. 4B shows the data format modification screen SC21d. The data format modification screen SC21d includes data format modification buttons BT211m-BT211r. The data format modification buttons BT211m-BT211r enable the user to select "PDF," "PDF/A," "Secure PDF," "Signed PDF," "MEG," and "XPS," respectively.

"PDF/A" is similar to the PDF format but allows embedding of metadata. "Signed PDF" is a PDF file that includes an electronic signature for confirming that the document has not been tampered with, for example. "Secure PDF" is an encrypted PDF file that requires a password to view.

FIG. 4C shows the duplex setting modification screen SC21e. The duplex setting modification screen SC21e includes duplex setting modification buttons BT211s-BT211u.

When "Long Edge" is selected, the control unit 20 will read both sides of each original sheet and generate scan data for a plurality of pages so that the pages are bound on their long edge. When "Short Edge" is selected, the control unit 20 will read both sides of each original sheet and generate scan data for a plurality of pages so that the pages are bound on their short edge.

In S50 the execution control unit 53 executes a scanning operation based on the setting conditions specified by the user. The execution control unit 53 transmits scan data obtained through this scanning operation to the portable terminal 80 through wireless communications.

As a variation to the above step, the execution control unit 53 may store the scan data acquired through the scanning operation in the memory unit 40 rather than transmitting the data to the portable terminal 80. The user can then acquire scan data from the memory unit 40 by mounting USB memory or other portable memory into a memory mounting unit (not shown) of the MFP 10.

When the MFP 10 acquires a print command from an external source (S20: YES), in S60 the control unit 20 displays a reception screen SC3 (see FIG. 3C) on the display unit 21 to indicate that a print command is being acquired from the portable terminal 80. The reception screen SC3 includes a character string TX3 indicating that the MFP 10 is in the process of acquiring a print command.

In S70 the first determination unit 54 determines whether the MFP 10 can execute the data conversion process based on the print command obtained from the portable terminal 80. More specifically, the first determination unit 54 determines whether the MFP 10 can execute the data conversion process on the PDL data in the print command obtained from the portable terminal 80 using one of the data conversion programs 41 stored in the memory unit 40.

The method of determining in S70 whether the MFP 10 can execute the data conversion process will be described next in greater detail. While not shown in the drawings, the memory unit 40 also stores rules used to identify the format of the PDL data. For example, PDF data normally begins with the character string "%PDF," followed by a draw command. Hence, the rules stored in the memory unit 40 enable the first determination unit 54 to identify the format of PDL data as PDF when the PDL data begins with the four bytes "%PDF."

As described above, the memory unit 40 of the MFP 10 stores the JPEG conversion program 41a and TIFF conversion program 41b. Accordingly, the first determination unit 54 determines that the MFP 10 can execute the data conversion process on the acquired PDL data when the format of this PDL data is either JPEG or TIFF, and determines that the MFP 10 cannot execute the data conversion process when the acquired PDL data is described in another format (PDF, for example). The process advances to S80 when the first determination unit 54 determines that the MFP 10 can execute the data conversion process (S70: YES) and advances to S130 when the first determination unit 54 determines that the MFP 10 cannot execute the data conversion process (S70: NO).

In the embodiment, the supply unit 55 of the MFP 10 supplies the PDL data to the server 60 to be converted to print data when the MFP 10 cannot execute the data conversion process. That is, the MFP 10 instructs the server 60 to execute the data conversion process on the PDL data acquired from the portable terminal 80. This process will be described later in greater detail.

When the MFP 10 cannot execute the data conversion process (S70: NO), the display control unit 51 displays a limited idle screen SC1a (described later with reference to FIG. 6A) on the display unit 21 of the MFP 10 in place of the reception screen SC3. When the MFP 10 can execute the data conversion process (S70: YES), the display control unit 51 displays a printing screen SC4 (see FIG. 3D) on the display unit 21 in place of the reception screen SC3. The printing screen SC4 includes a character string TX4 indicating that the MFP 10 is currently executing a printing operation on the print data.

In S80 the execution control unit 53 performs a data conversion process on the acquired PDL data according to the data conversion programs 41. For example, when the PDL data is described in the JPEG format, the execution control unit 53 executes the JPEG conversion program 41a in the memory unit 40 to perform the data conversion process. By executing the process in S80, the execution control unit 53 converts the PDL data to print data.

In S90 the execution control unit 53 performs a printing operation based on the print data generated in S80 (or S130 described later). That is, the execution control unit 53 executes a printing operation based on print data generated in S80 when the PDL data was in a format that could be converted on the MFP 10 (S70: YES) and executes a printing operation based on print data acquired from the server 60 when the MFP 10 was incapable of converting the PDL data (S70: NO) and requested the server 60 to perform the data conversion process in a server conversion process of S130 described below.

In S140 the control unit 20 notifies the portable terminal 80 that the printing operation is complete and subsequently returns to S10 to display the normal idle screen SC1.

Server Conversion Process

Figure 5:
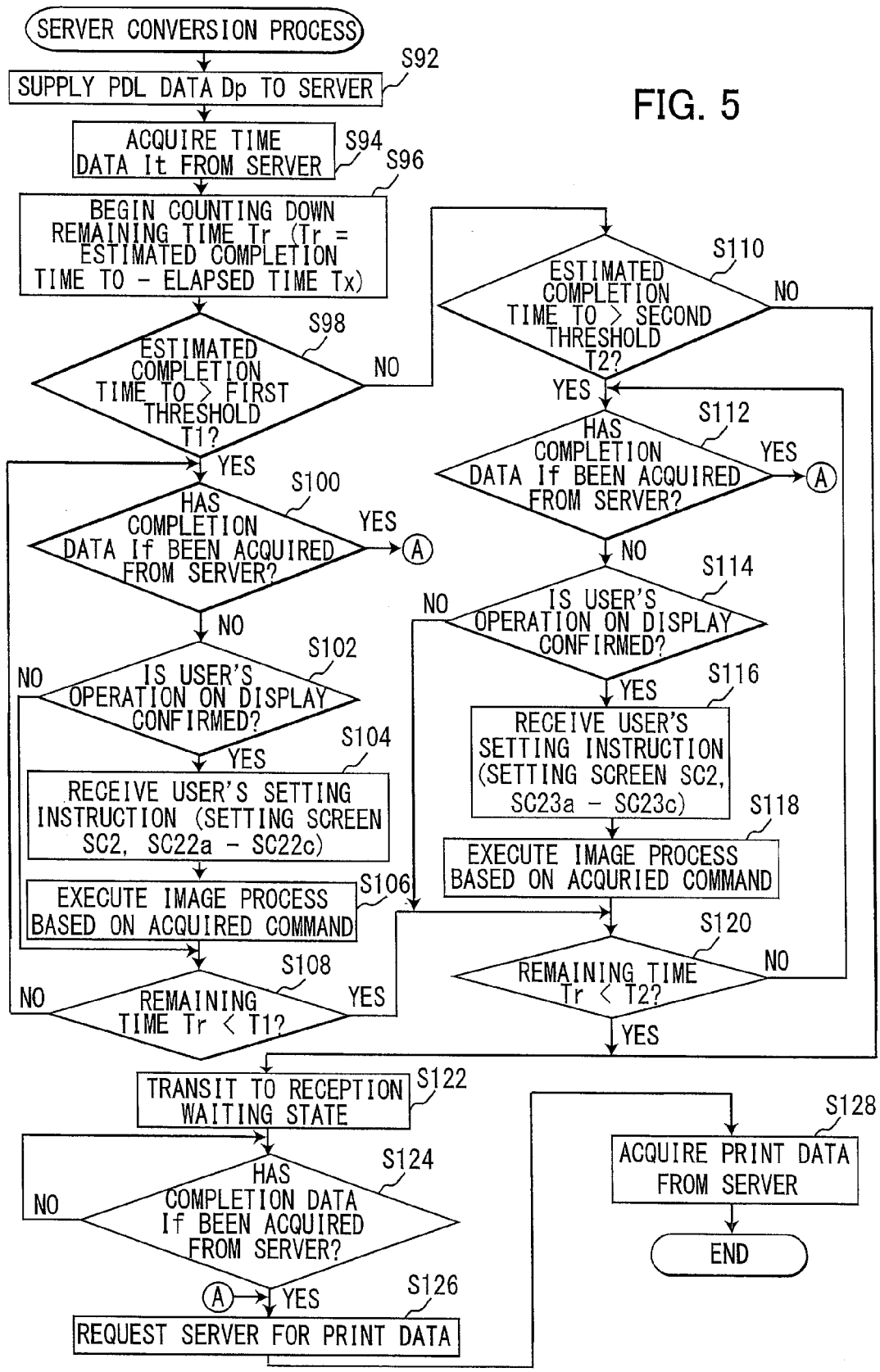
FIG. 5 is a flowchart illustrating steps in a server conversion process shown in FIG. 2.

Next, the server conversion process performed in S130 of FIG. 2 will be described with reference to FIG. 5. FIG. 5 is a flowchart illustrating steps in the server conversion process. The control unit 20 begins the server conversion process after the first determination unit 54 determines in S70 of FIG. 2 that the MFP 10 cannot execute the data conversion process on PDL data acquired from the portable terminal 80. In S92 of FIG. 5 the supply unit 55 supplies PDL data Dp acquired from the portable terminal 80 and command data Io for executing a data conversion process to the server 60. In S94 the time data acquisition unit 56 acquires time data It from the server 60, where the time data It indicates the length of time that the server 60 will require to execute the data conversion process on the PDL data Dp supplied from the supply unit 55.

In order to generate the time data It, the manager of the server 60 previously prepares a time computation table (not shown) and stores this table in the memory of the server 60, for example. The time computation table defines correlations between the size of PDL data to undergo the data conversion process, and the estimated length of time required to perform the data conversion process on PDL data of this size. The control unit 70 of the server 60 can use this time computation table to determine the estimated amount of time required to complete the data conversion process on the acquired PDL data Dp (hereinafter called the estimated completion time T0). When the server 60 completes the data conversion process, the server 60 transmits completion data If to the MFP 10 indicating that the data conversion process has completed.

In S96 the time identification unit 58 begins counting down a remaining time Tr indicating the amount of time remaining until the MFP 10 can acquire from the server 60 the print data produced in the data conversion process on the PDL data Dp. The remaining time Tr is found by the following Equation (4).

$$Tr = T0 - Tx \qquad \text{Equation (4)}$$

Here, Tr is the remaining time, T0 the estimated completion time, and Tx the amount of elapsed time since the PDL data Dp was supplied to the server 60.

In the embodiment, the MFP 10 can execute specific image processes, such as a scanning operation, depending on the remaining time Tr, while the server 60 is performing the data conversion process on the PDL data Dp (before the estimated completion time T0 has elapsed). Next, a description will be given of the process in S98-S108 performed until the remaining time Tr becomes less than a first threshold T1, and the process of S110-S120 performed until the remaining time Tr drops below a second threshold T2, wherein the second threshold T2 is smaller than the first threshold T1.

Figure 6A:
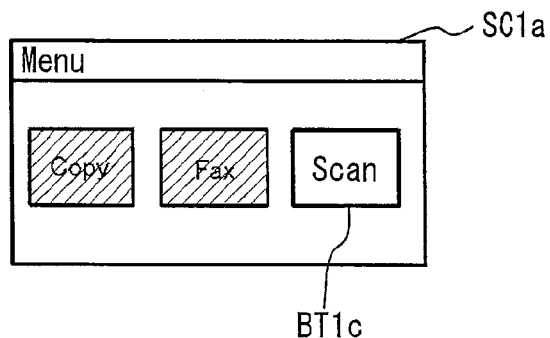
FIGS. 6A-6D show various screens displayed on the display unit during the process of FIG. 5.

FIGS. 6A-6D show various screens displayed on the display unit 21 while the remaining time Tr remains above the first threshold T1. FIG. 6A shows the limited idle screen SC1a.

As shown in FIG. 6A, the limited idle screen SC1a includes the scan function selection button BT1c. However, unlike the normal idle screen SC1 shown in FIG. 3A, the limited idle screen SC1a does not include the copy function selection button BT1a or the fax function selection button BT1b. More accurately, the scan function selection button BT1c is the only active (selectable) button in the limited idle screen SC1a, while the other two buttons are inactive (disabled) and have been greyed out to indicate this inactive state. In this situation, the copy function and the fax function are not allowed, and only the scan function is allowed. This is because a scanning operation requires less time to complete than a copying operation or faxing operation. Thus, by displaying the limited idle screen SC1a, the display control unit 51 allows only for the selection of image processes (the scanning operation in this example) that are likely to require only a short processing time and, hence, that the execution control unit 53 can execute properly within the remaining time Tr.

In S98 the time data acquisition unit 56 determines whether the estimated completion time T0 specified in the time data It acquired from the server 60 is longer than the first threshold T1. The manager of the server 60 sets the first threshold T1 to an appropriate length (one minute, for example). If the time data acquisition unit 56 determines that the estimated completion time T0 is less than or equal to the first threshold T1 (S98: NO), the process advances to S110.

However, if the time data acquisition unit 56 determines in S98 that the estimated completion time T0 is greater than the first threshold T1 (S98: YES), then the process advances to S100. In S100 the data acquisition unit 57 determines whether completion data If has been received from the server 60 indicating that the data conversion process on the PDL data Dp supplied in S92 has completed. If the completion data If has been acquired (S100: YES), the process advances to S126. However, if completion data If has not yet been acquired (S100: NO), the process advances to S102.

In S102 the reception unit 52 determines whether the user has pressed the scan function selection button BT1c in the limited idle screen SC1a. If the scan function selection button BT1c has not been selected (S102: NO), the process advances to S108. However, if the scan function selection button BT1c was selected (S102: YES), in S104 the display control emit 51 displays the settings screen SC2 (see FIG. 3B) on the display unit 21, prompting the user to specify conditions for a scanning operation.

If the user selects the modification button BT2a in the settings screen SC2, the display control unit 51 displays a scanning quality modification screen SC22a (described later with reference to FIG. 6B) for modifying the scanning quality. If the user selects the modification button BT2b, the display control unit 51 displays a data format modification screen SC22b (described later with reference to FIG. 6C) for modifying the data format. If the user selects the modification button BT2c, the display control unit 51 displays a duplex setting modification screen SC22c (described later with reference to FIG. 6D) for modifying the duplex setting.

Figure 6B:
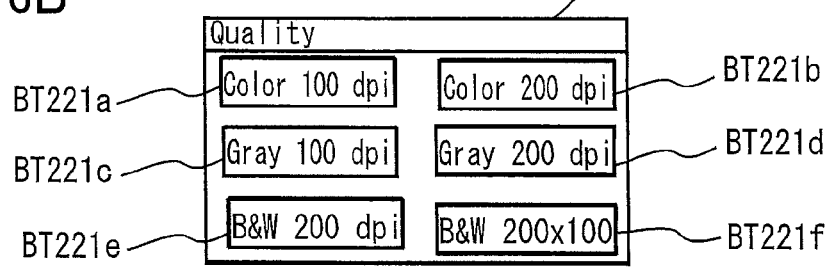

FIG. 6B shows the scanning quality modification screen SC22a. The scanning quality modification screen SC22a includes scanning quality modification buttons BT221a-

BT221f. The scanning quality modification screen SC22a corresponds to the modification screens SC21a-2C21c in FIG. 4A.

Figure 6C:
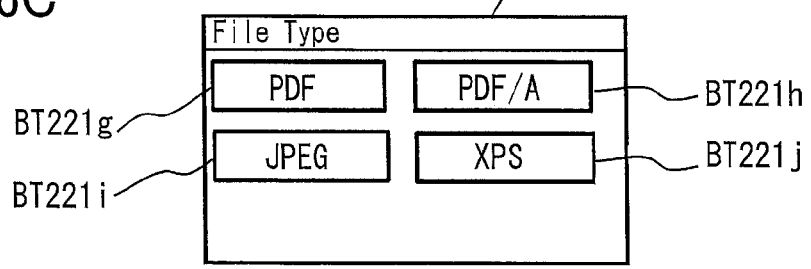

FIG. 6C shows the data format modification screen SC22b. The data format modification screen SC22b includes data format modification buttons BT221g-BT221j. The data format modification screen SC22b corresponds to the modification screen SC21d in FIG. 4B.

Figure 6D:
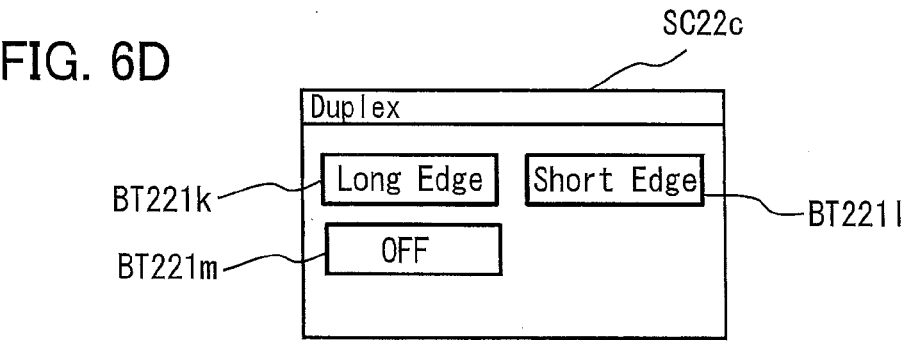

FIG. 6D shows the duplex setting modification screen SC22c. The duplex setting modification screen SC22c includes duplex setting modification buttons BT221k-BT221m. The duplex setting modification screen SC22c corresponds to the modification screen SC21e in FIG. 4C.

In the embodiment, a processing time table (not shown) is stored in the memory unit 40 of the MFP 10. The processing time table describes correlations between scanning conditions, and the time required for performing a scanning operation under each of these conditions. The display control unit 51 of the MFP 10 references this processing time table to display options on the display unit 21 for conditions that allow the scanning operation to be completed within the first threshold T1. The execution control unit 53 executes the scanning operation based on conditions that can be implemented within the first threshold T1. Therefore, the scanning operation is executed on the MFP 10 within the estimated completion time T0 by which the server 60 completes the data conversion process. Accordingly, the printing operation performed on the MFP 10 in S90 of FIG. 2 is not delayed by this scanning operation.

As is evident in the drawings, the number of options in the scanning quality modification screen SC22a of FIG. 6B is fewer than the number of options in the scanning quality modification screens SC21a-SC21c in FIG. 4A. Hence, the user has fewer options to select in S104 of the process in FIG. 5 than the number of options allowed in S40 of the process in FIG. 2. The display control unit 51 displays only those options for conditions that allow the MFP 10 to execute a process within the first threshold T1. Accordingly, the MFP 10 can properly perform the scanning operation within the first threshold T1. This step is also user-friendly as the user can determine which options are possible by referencing the options displayed on the display unit 21.

In S106 the execution control unit 53 executes a scanning operation based on the user-specified setting conditions and subsequently transmits the scan data obtained through the scanning operation to the portable terminal 80 through wireless communications. After confirming that the scanning operation was completed, the display control unit 51 displays the limited idle screen SC1a of FIG. 6A on the display unit 21 in place of the settings screen SC2 and setting modification screens SC22a-Sc22c.

In S108 the time identification unit 58 determines whether the remaining time Tr that the time identification unit 58 began counting down in S96 has dropped below the first threshold T1 (i.e., whether the condition "remaining time Tr<first threshold T1" is satisfied). If the time identification unit 58 determines that the remaining time Tr is not less than the first threshold T1 (S108: NO), then the process returns to S100. However, if the time identification unit 58 determines that the remaining time Tr has dropped below the first threshold T1 (S108: YES), then the process advances to S120.

Next, the process in S110-S120 executed while the remaining time Tr has not fallen below the second threshold T2 will be described. When the time data acquisition unit 56 determines in S98 that the estimated completion time T0 specified by the time data It acquired from the server 60 is less than or equal to the first threshold T1 (S98: NO), in S110 the time data acquisition unit 56 determines whether the estimated completion time T0 is greater than the second threshold T2. The manager of the server 60 sets the second threshold T2 to a suitable value (30 seconds, for example). If the time data acquisition unit 56 determines that the estimated completion time T0 is less than or equal to the second threshold T2 (S110: NO), the process skips to S122.

However, if the time data acquisition unit 56 determines that the estimated completion time T0 is greater than the second threshold T2 (S110: YES), i.e., if the estimated completion time T0 satisfies the expression "T2<T0<T1," then in S112 the data acquisition unit 57 determines whether completion data If was acquired from the server 60 indicating that the data conversion process on the PDL data Dp supplied in S92 has completed. If completion data If has been acquired (S112: YES), the process advances to S126. However, if completion data If has not yet been obtained (S112: NO), the process advances to S114.

In S114 the reception unit 52 determines whether the user has operated the scan function selection button BT1c in the limited idle screen SC1a of FIG. 6A. If the scan function selection button BT1c has been operated (S114: YES), in S116 the display control unit 51 displays the settings screen SC2 (see FIG. 3B), prompting the user to specify conditions for executing a scanning operation.

If the user selects the modification button BT2a in the settings screen SC2, the display control unit 51 displays a scanning quality modification screen SC23a (described later with reference to FIG. 7A) for modifying the scanning quality. If the user selects the modification button BT2b, the display control unit 51 displays a data format modification screen SC23b (described later with reference to FIG. 7B) for modifying the data format. If the user selects the modification button BT2c, the display control unit 51 displays a duplex setting modification screen SC23c (described later with reference to FIG. 7C) for modifying the duplex setting.

Figure 7A:
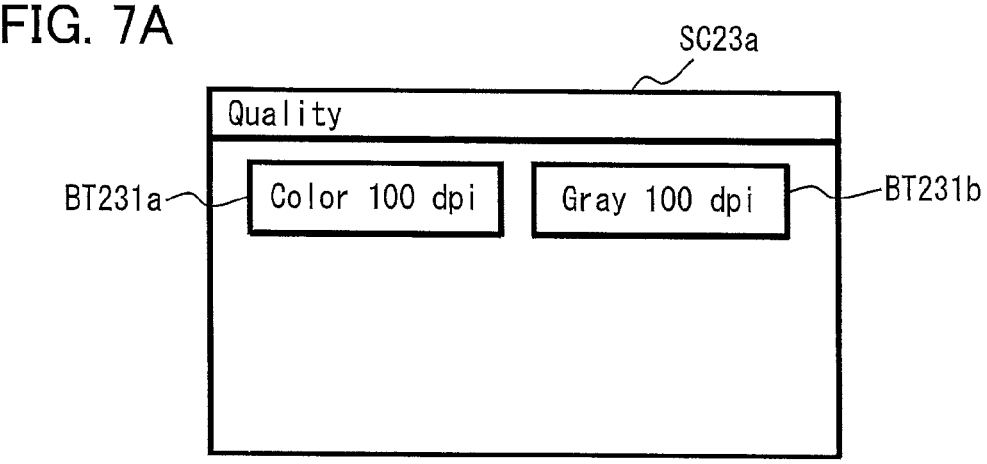
FIGS. 7A-7C show other various screens displayed on the display unit during the process of FIG. 5.
Figure 7B:
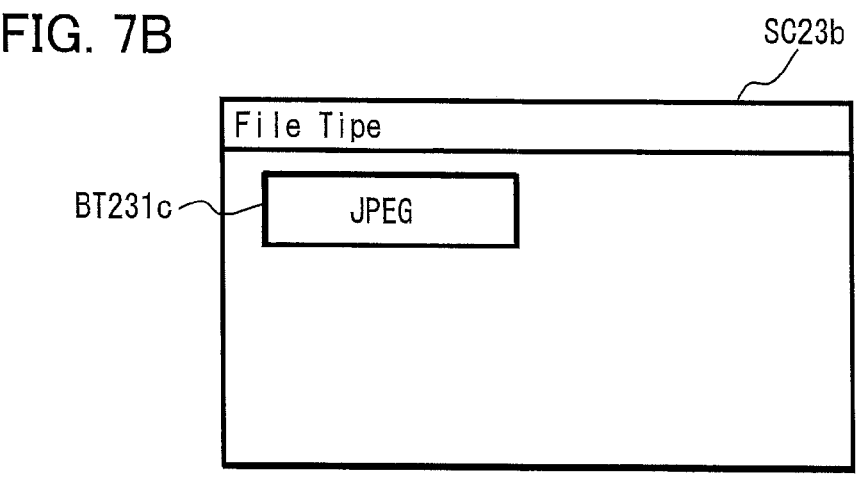
Figure 7C:
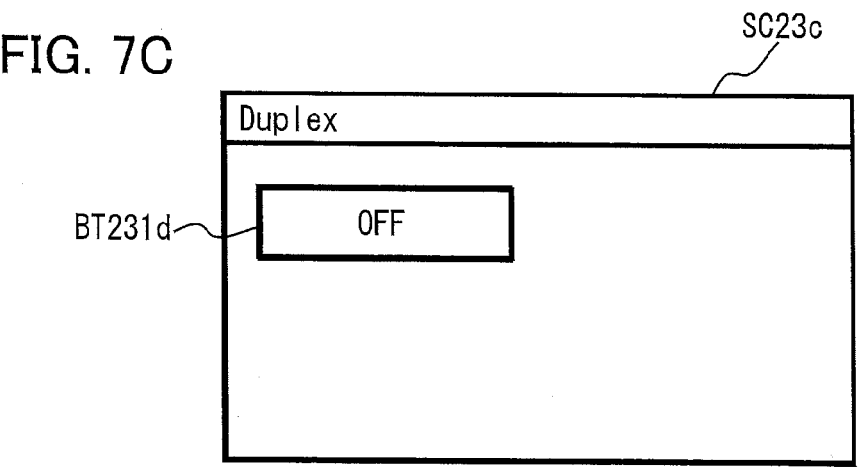

FIGS. 7A-7C show the various screens displayed on the display unit 21 until the remaining time Tr has dropped below the second threshold T2. FIG. 7A shows the scanning quality modification screen SC23a. The scanning quality modification screen SC23a includes scanning quality modification buttons BT231a and BT231b. The scanning quality modification screen SC23a corresponds to the screens SC21a-SC21c in FIG. 4A and the screen SC22a in FIG. 6B.

FIG. 7B shows the data format modification screen SC23b. The data format modification screen SC23b includes a data format modification button BT231c. The data format modification screen SC23b corresponds to the screen SC21d in FIG. 4B and the screen SC22b in FIG. 6C.

FIG. 7C shows the duplex setting modification screen SC23c. The duplex setting modification screen SC23c includes a duplex setting modification button BT231d. The duplex setting modification screen SC23c corresponds to the screen SC21e in FIG. 4C and the screen SC22c in FIG. 6D.

In S116 the display control unit 51 references the processing time table described earlier to display options on the display unit 21 for conditions that allow a process to be executed within the second threshold T2. Therefore, the execution control unit 53 will only execute a scanning operation that is based on these conditions and, hence, that can be completed within the second threshold T2. Accordingly, the execution control unit 53 can properly execute a scanning operation within the second threshold T2 while the server 60 is executing the data conversion process.

The number of options included in the scanning quality modification screen SC23a of FIG. 7A is fewer than the number of options in the scanning quality modification screens SC21a-SC21c of FIG. 4A. In other words, the number of options that the user can select in S116 of FIG. 5 is fewer than the number allowed in S40 of the process in FIG. 2. Further, the number of options included in the scanning quality modification screen SC23a of FIG. 7A displayed on the display unit 21 is fewer than the number of options in the scanning quality modification screen SC22a of FIG. 6B. Thus, the display control unit 51 displays only those options for conditions that allow the MFP 10 to execute a scanning operation within the second threshold T2. Accordingly, the execution control unit 53 can properly execute the scanning operation within the second threshold T2. Further, this step is user-friendly since the user can easily determine which options are available for executing a scanning operation within the second threshold T2 by referencing the display unit 21.

Further, the display control unit 51 displays the setting modification screens SC23a-Sc23c on the display unit 21 in place of the setting modification screens SC22a-Sc22c when the remaining time Tr has changed from being greater than or equal to the first threshold T1 to being less than the first threshold T1 but greater than or equal to the second threshold T2. Accordingly, the user can determine when the data conversion process executed by the server 60 has neared completion.

In S118 the execution control unit 53 executes the scanning operation based on the user-specified scanning conditions, and subsequently transmits the scan data obtained through this scanning operation to the portable terminal 80 via wireless communications. After confirming that the scanning operation has completed, the display control unit 51 displays the limited idle screen SC1a on the display unit 21 in place of the settings screen SC2 and the setting modification screens SC23a-Sc23c.

In S120 the second determination unit 59 determines whether the remaining time Tr that the time identification unit 58 began counting down in S96 has dropped below the second threshold T2 (i.e., whether the condition "Tr<T2" is satisfied). If the second determination unit 59 determines that the remaining time Tr is not less than the second threshold T2 (S120: NO), the process returns to S112. However, if the second determination unit 59 determines that the remaining time Tr has dropped below the second threshold T2 (S120: YES), the process advances to S122.

In S122 the display control unit 51 displays the reception screen SC3 on the display unit 21 in place of the limited idle screen SC1a. That is, the display control unit 51 displays the reception screen SC3 on the display unit 21 when the remaining time Tr is less than or equal to the second threshold T2. Once the reception screen SC3 is displayed, the user is no longer able to command the MFP 10 to execute an image process. In other words, the MFP 10 no longer receives commands for scanning operations when the estimated remaining time for the server 60 to complete the data conversion process is less than the second threshold T2. Accordingly, the MFP 10 can properly acquire print data from the server 60.

In S124 the data acquisition unit 57 determines whether completion data If has been acquired from the server 60, indicating that the data conversion process on the PDL data supplied in S92 has been completed. The process advances to S126 when completion data If has been acquired (S124: YES).

In the embodiment, the server 60 transmits completion data If to the MFP 10 upon completing the data conversion process on the PDL data supplied from the MFP 10. The server 60 continually transmits the completion data If to the MFP 10 at prescribed intervals until a request for print data is received from the MFP 10. The MFP 10 issues a request for print data to the server 60 when the completion data If has been acquired from the server 60 and while the execution control unit 53 is not executing a specific image process (the scanning operation in the embodiment). Hence, the data acquisition unit 57 can acquire print data from the server 60 at a suitable timing.

In S126 the data acquisition unit 57 issues a request to the server 60 to transmit the print data produced from the data conversion process. In S128 the data acquisition unit 57 acquires the print data from the server 60. The server conversion process of FIG. 5 ends after completing the process in S128.

Specific Cases

Next, two specific cases of the server conversion process will be described with reference to FIGS. 8 and 9. In Case A of FIG. 8, the MFP 10 acquires completion data If from the server 60 while not currently executing a scanning operation in S106 or S118. In Case B of FIG. 9, the MFP 10 acquires the completion data If from the server 60 while executing a scanning operation in S106 or S118. Both cases will assume that the PDL data transmitted from the portable terminal 80 is described in the PDF format and, hence, requires a data conversion process that the MFP 10 cannot perform.

Case A

Figure 8:
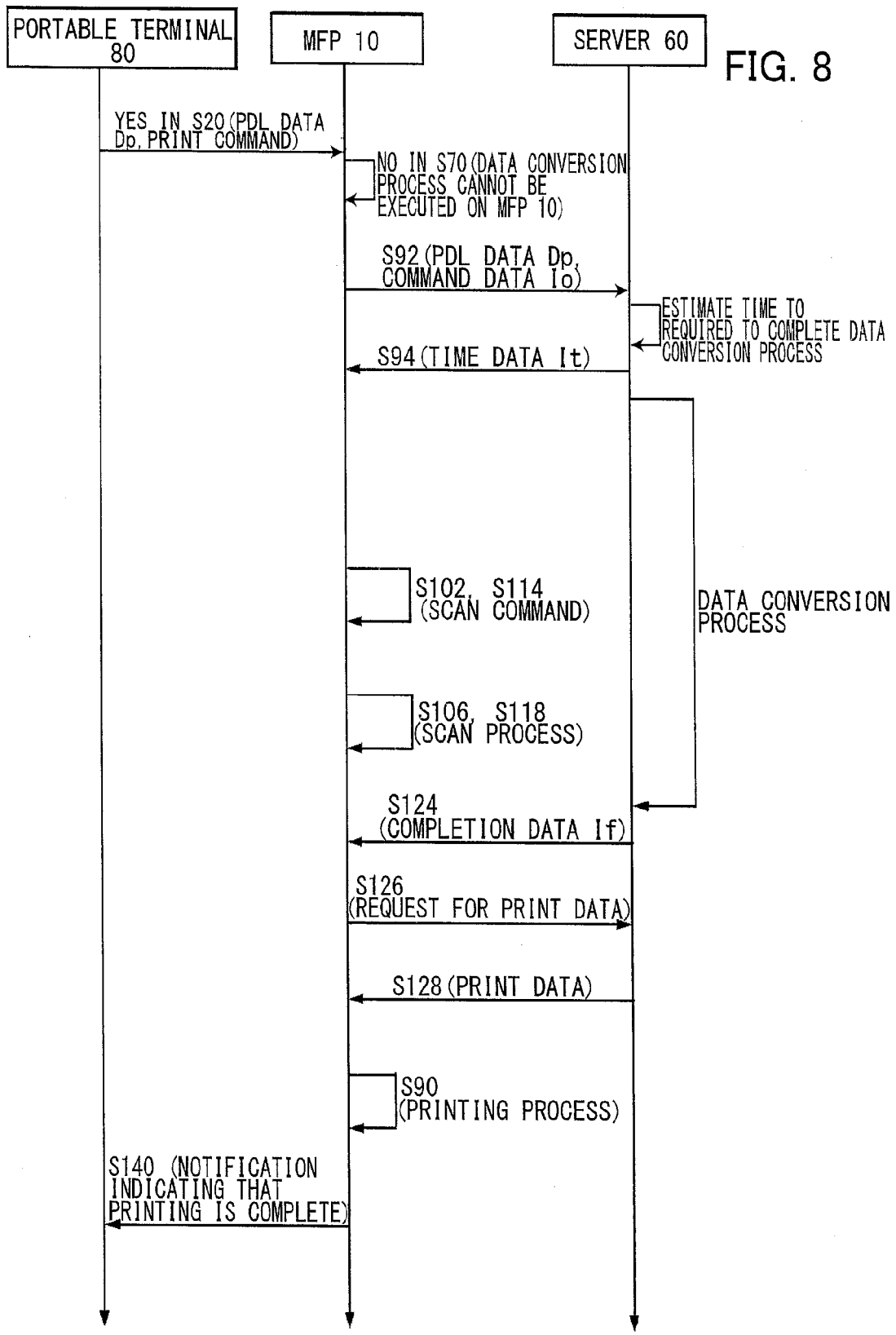
FIG. 8 illustrates a sequence of actions executed in exemplary case A.

As shown in FIG. 8, the portable terminal 80 supplies the PDL data Dp to the MFP 10. The MFP 10 determines that the PDL data (PDF) acquired from the portable terminal 80 cannot be processed on the MFP 10, and supplies this PDL data to the server 60.

The server 60 determines the size and the like of the PDL data acquired from the MFP 10 and calculates (estimates) the time required to complete a data conversion process on this PDL data. The server 60 supplies time data It indicating this calculated time to the MFP 10.

The MFP 10 displays setting modification screens SC22a-Sc22c and SC23a-Sc23c depending on the estimated completion time T0 indicated by the acquired time data It. The MFP 10 subsequently executes a scanning operation when the user inputs a scan command through operations on the display unit 21. In the meantime, the server 60 executes the data conversion process on the PDL data Dp.

Upon completing the data conversion process, the server 60 transmits the completion data If to the MFP 10, and the MFP 10 acquires this completion data If. In Case A, the MFP 10 has completed all scanning operations when the completion data If is acquired from the server 60. Accordingly, the MFP 10 issues a request for print data to the server 60 upon acquiring the completion data If.

The server 60 supplies the print data produced from the data conversion process to the MFP 10. The MFP 10 executes a printing operation based on the print data acquired from the server 60. Upon completing the printing operation, the MFP 10 transmits a notification to the portable terminal 80 indicating that the printing operation is complete.

Case B

Figure 9:
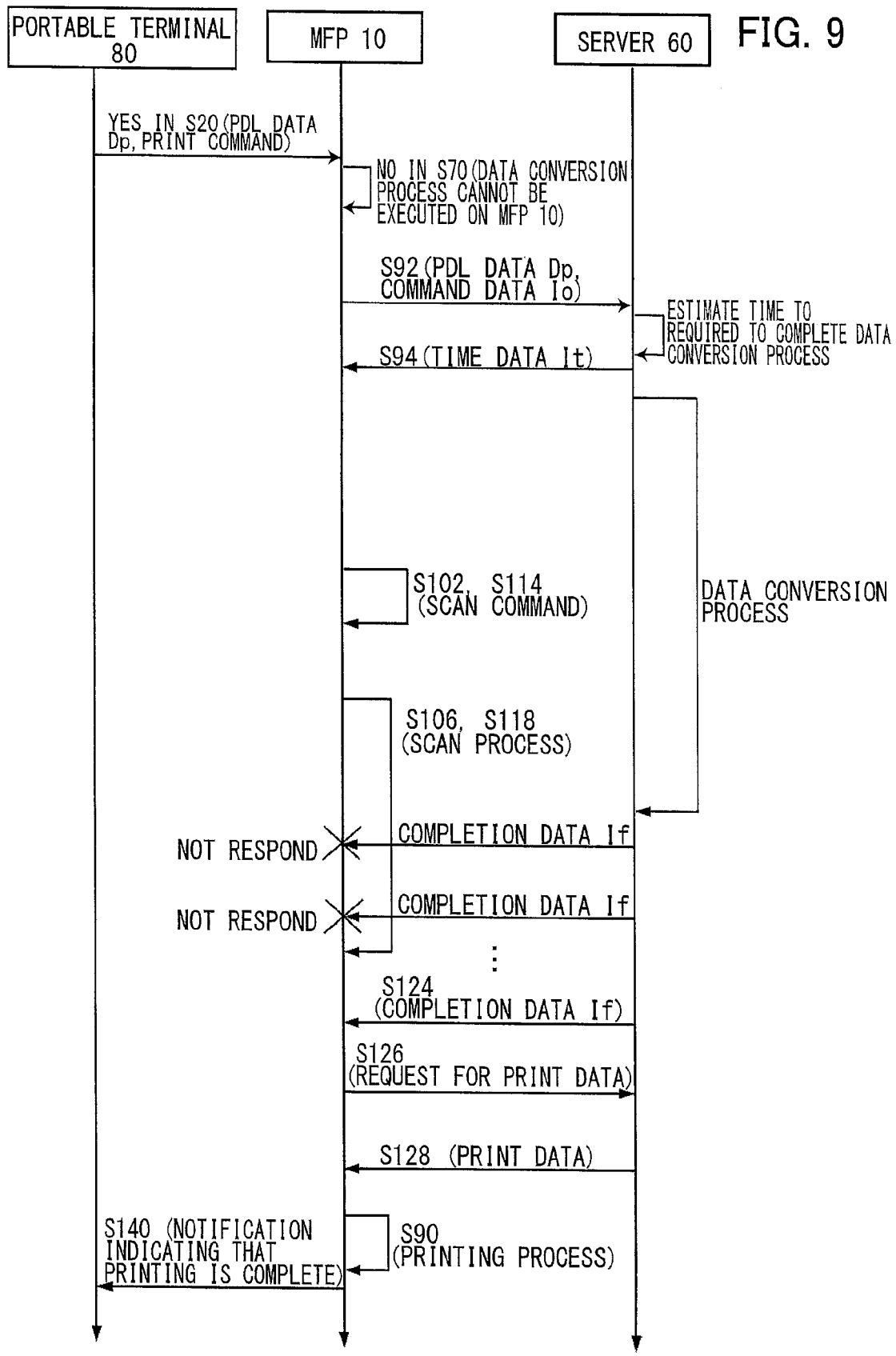
FIG. 9 illustrates a sequence of actions executed in exemplary case B.

As shown in FIG. 9, the portable terminal 80 supplies the PDL data Dp to the MFP 10. The MFP 10 determines that the PDL data Dp acquired from the portable terminal 80 cannot be processed on the MFP 10, and supplies this PDL data Dp to the server 60.

The server 60 determines the size and the like of the PDL data Dp acquired from the MFP 10 and calculates (estimates) the time required to complete a data conversion process on this PDL data. The server 60 supplies time data It indicating this calculated time to the MFP 10.

The MFP 10 displays setting modification screens SC22a-Sc22c and SC23a-Sc23c depending on the estimated completion time T0 indicated by the acquired time data It. The MFP 10 subsequently executes a scanning operation when the user inputs a scan command through operations on the display unit 21. In the meantime, the server 60 executes the data conversion process on the PDL data Dp.

The MFP 10 acquires completion data If from the server 60. In Case B, the MFP 10 has not yet completed a scanning operation when the completion data If is acquired from the server 60 due to a delay in data generation or the like after the scanning operation was initiated. Accordingly, the MFP 10 does not issue a request to the server 60 for print data when the completion data If is acquired. That is, the MFP 10 continues executing the scanning operation as the execution control unit 53, even after receiving the completion data If from the server 60.

The server 60 continues transmitting the completion data If to the MFP 10 at prescribed intervals until a request is received from the MFP 10 for the print data. After completing the scanning operation, the MFP 10 issues a request to the server 60 for print data.

When a request for print data is received from the MFP 10, the server 60 supplies the print data produced from the data conversion process to the MFP 10. The MFP 10 executes a printing operation based on the print data acquired from the server 60. Upon completing the printing operation, the MFP 10 transmits a notification to the portable terminal 80 indicating that the printing operation is complete.

While the invention has been described in detail with reference to the specific embodiment thereof, it would be apparent to those skilled in the art that many modifications and variations may be made therein without departing from the spirit of the invention, the scope of which is defined by the attached claims.

(1) For example, in the embodiment described above, the server 60 executes various processes on the PDL data Dp, including the RIP process, color conversion process, and halftone process. However, it is sufficient for the server 60 to execute only one of these three processes instead. Further, the server 60 may execute a process for converting the format of the PDL data, such as a process for converting PDL data from the PDF format to the JPEG format.

While the embodiment describes cases in which a print command is acquired from the portable terminal 80, the present invention may be applied to other image processes. For example, the MFP 10 may acquire a command from the portable terminal 80 to execute a scanning operation. In this case, the MFP 10 may issue instructions to the server 60 to execute specific processes for generating scan data, such as a process for adding OCR (optical character recognition) data to the scan data.

In the embodiment described above, the MFP 10 instructs the server 60 to execute a data conversion process on acquired PDL data, when the format of the PDL data is not supported by the data conversion programs 41 stored in the memory unit 40 of the MFP 10. However, the MFP 10 may also instruct the server 60 to execute the data conversion process when the format of the PDL data is supported by the data conversion programs 41 stored in the memory unit 40.

Although the scan function is the only function available during the server conversion process of the embodiment described above, the MFP 10 may allow the execution of other image processes, such as the copy function. In this case, the copy function and scan function can be selected in S98-S108 of the server conversion process in FIG. 5, while only the scan function is available in S112-S120.

Further, while only the scan function selection button BT1*c* for selecting the scan function is made active in the limited idle screen SC1*a*, the other buttons BT1*a* and BT1*b* may also be made available, and the MFP 10 may simply ignore commands for executing these other functions when their buttons are selected.

(2) While the available options related to resolution, color/monochrome, data format, and duplex scanning differ depending on whether the scanning operation is executed in S106 of FIG. 5 or in S118 in the embodiment, other conditions such as the allowable number of pages to be scanned may also differ between these two situations.

(3) In the embodiment described above, the MFP 10 does not respond to completion data If received from the server 60 when executing a scanning operation at the time. However, the MFP 10 may transmit a queue notification to the server 60 upon receiving the completion data If when currently executing a scanning operation.

(4) The functions of the units 51-59 in the embodiment described above are implemented by the CPU 30 executing processes based on the data conversion programs 41, but one or more of the units 51-59 may be implemented in hardware via logic circuits and the like.

What is claimed is:

1. An image processing apparatus connectable to a server via a network, the image processing apparatus comprising:
   a processor; and
   a memory that stores computer readable instructions that cause, when executed by the processor, the image processing apparatus to implement:
   receiving a first command for execution of an image processing function;
   when a first process which is to be executed based on the first command includes a conversion process for converting image data, judging whether the conversion process should be executed on the image processing apparatus;
   supplying the server with a conversion command for executing the conversion process on the image data when it is determined that the conversion process should not be executed on the image processing apparatus;
   acquiring time data indicative of a conversion period of time that the server requires to execute the conversion process;
   receiving, within the conversion period of time, a second command for execution of an image processing function;
   judging whether a second process, which is to be executed based on the second command, can be completed within the conversion period of time;
   starting execution of the second process within the conversion period of time when it is determined that the second process can be completed within the conversion period of time, and failing to start execution of the second process within the conversion period of time when it is determined that the second process cannot be completed within the conversion period of time;
   acquiring from the server converted data that is obtained by executing the conversion process on the image data; and
   executing a prescribed process using the converted data.

2. The image processing apparatus according to claim 1, wherein the computer readable instructions, when executed by the processor, cause the image processing apparatus to further implement:
   displaying, before the first command is received, first process options, from among which a user is allowed to select to be executed on the image processing apparatus;

displaying, before the second command is received, second process options, from among which the user is allowed to select to be executed on the image processing apparatus,
a number of the second process options being smaller than a number of the first process options.

3. The image processing apparatus according to claim 2, wherein the computer readable instructions, when executed by the processor, cause the image processing apparatus to further implement:
displaying, before the first command is received, first conditional options, from among which the user is allowed to select as a condition for a process to be executed on the image processing apparatus; and
displaying, before the second command is received, second conditional options, from among which the user is allowed to select as a condition for a process to be executed on the image processing apparatus,
a number of the second conditional options being smaller than a number of the first conditional options if the process to be executed under the condition to be selected from the first conditional options employing the same image processing function as the process to be executed under the condition to be selected from the second conditional options.

4. The image processing apparatus according to claim 2, wherein each second process option includes a series of processes that should be executed on the image processing apparatus.

5. The image processing apparatus according to claim 4, wherein the computer readable instructions, when executed by the processor, cause the image processing apparatus to further implement:
acquiring from the server completion data indicating that the data conversion process has completed; and
continuing execution of the second process without requesting the server for the converted data if execution of the second process has not been completed when the completion data is acquired, and requesting the server for the converted data if execution of the second process has been completed when the completion data is acquired.

6. The image processing apparatus according to claim 1, wherein the computer readable instructions, when executed by the processor, cause the image processing apparatus to further implement:
displaying, before the second command is received, one of a first group of conditional options and a second group of conditional options, from among which a user is allowed to select as a condition for the second process,
the first group of conditional options being displayed if the conversion period of time is longer than a prescribed time length, and the second group of conditional options being displayed if the conversion period of time is shorter than or equal to the prescribed time length,
a number of conditional options constituting the second group of conditional options being smaller than a number of conditional options constituting the first group of conditional options.

7. The image processing apparatus according to claim 6, wherein the computer readable instructions, when executed by the processor, cause the image processing apparatus to further implement:
identifying an elapsed time from a time when the conversion command is supplied to the server; and
displaying a second screen showing the second group of options in place of a first screen showing the first group of options when a remaining time determined by subtracting the elapsed time from the conversion period of time becomes shorter than the prescribed time length.

8. The image processing apparatus according to claim 1, wherein the computer readable instructions, when executed by the processor, cause the image processing apparatus to further implement:
identifying an elapsed time from a time when the conversion command is supplied to the server;
judging whether a remaining time determined by subtracting the elapsed time from the conversion period of time becomes shorter than a prescribed time length; and
prohibiting execution of the second process if it is determined that the remaining time becomes shorter than the prescribed time length.

9. An image processing method comprising:
receiving a first command for execution of an image processing function;
when a first process which is to be executed based on the first command includes a conversion process for converting image data, judging whether the conversion process should be executed on an image processing apparatus;
supplying a server with a conversion command for executing the conversion process on the image data when it is determined that the conversion process should not be executed on the image processing apparatus;
acquiring time data indicative of a conversion period of time that the server requires to execute the conversion process;
receiving, within the conversion period of time, a second command for execution of an image processing function;
judging whether a second process, which is to be executed based on the second command, can be completed within the conversion period of time;
starting execution of the second process within the conversion period of time when it is determined that the second process can be completed within the conversion period of time, and failing to start execution of the second process within the conversion period of time when it is determined that the second process cannot be completed within the conversion period of time;
acquiring from the server converted data that is obtained by executing the conversion process on the image data; and
executing a prescribed process using the converted data.

10. A non-transitory computer-readable medium storing a set of program instructions installed on and executed by a computer for controlling an image processing apparatus connectable to a server via a network, the program instructions, when executed by the computer, causing the image processing apparatus to perform:
receiving a first command for execution of an image processing function;
when a first process which is to be executed based on the first command includes a conversion process for converting image data, judging whether the conversion process should be executed on the image processing apparatus;
supplying the server with a conversion command for executing the conversion process on the image data when it is determined that the conversion process should not be executed on the image processing apparatus;
acquiring time data indicative of a conversion period of time that the server requires to execute the conversion process;

receiving, within the conversion period of time, a second command for execution of an image processing function;

judging whether a second process, which is to be executed based on the second command, can be completed within the conversion period of time;

starting execution of the second process within the conversion period of time when it is determined that the second process can be completed within the conversion period of time, and failing to start execution of the second process within the conversion period of time when it is determined that the second process cannot be completed within the conversion period of time;

acquiring from the server converted data that is obtained by executing the conversion process on the image data; and executing a prescribed process using the converted data.

* * * * *